Patented Apr. 14, 1953

2,635,068

UNITED STATES PATENT OFFICE 2,635,068

PROCESS OF TREATING AMYLACEOUS MATERIALS BY PRESSURE HOMOGENIZATION

Lancelot H. Rees, Westwood, Mass., assignor to Manton-Gaulin Manufacturing Company, Inc., Everett, Mass., a corporation of Massachusetts No Drawing. Application October 17, 1949, Serial No. 121,887

22 Claims. (Cl. 195—21)

This invention relates to manufacture of aqueous dispersions of modified amylaceous materials. More particularly, the invention has to do with a novel process of producing so-called starch solutions or pastes useful for many different purposes. Such starchy dispersions have long been produced by subjecting the original starch material to various kinds of treatment designed to convert or break down the granules or particles thereof mechanically, and perhaps also molecularly, to an extent sufficient to render the starch more compatible with and dispersible in water, if not actually soluble therein in the strict sense, and hence suitable for use in many different fields including, for example, textile and paper manufacture, and the fermentation industries. In accordance with the principles of the present invention, the amylaceous material to be thus converted or modified is subjected to pressure homogenization under operating conditions so controlled that the desired conversion or modification is accomplished in a particularly effective way and with remarkable rapidity, without causing appreciable degradation of starchy matter into derivatives such as sugars and dextrins, which are undesirable in starch solutions or pastes used for many purposes, such as starch sizes employed in textile or paper manufacture, for example.

For the purposes of this invention, and as used herein, the expression "pressure homogenization" or "pressure homogenizing" has a definite technical meaning or significance much less broad than the loose or generalized sense of merely "rendering homogeneous" in which such expression has sometimes been used. As employed in the present specification and claims, the expression signifies an operation essentially characterized by the fact that the preliminary aqueous mixture or suspension of the starchy material to be modified is forced under pressure to travel at high velocity through a very narrow or restricted orifice or passage provided between closely adjacent hard surfaces, the spacing apart of which is, typically, on the order of from 0.001 to 0.005 inch; whereby the material being treated is subjected to shearing and tearing forces in its passage through the restricted orifice, with resultant mechanical rupture and reduction in size of the starch particles. Commonly, as the fluid material issues at high velocity from said restricted orifice or passage, it is also caused to impinge directly against a hard surface and thereby undergo further physical breakdown through the shock or shattering effect of the high-velocity impact. Realization of the operating conditions essential to successful practice of the present process requires employing a positive displacement pressure type of homogenizer in carrying it out.

One of the most important practical applications of the invention at present is in the production of starch solutions for use as textile and paper sizes. Heretofore, in order to prepare starch size acceptable for such purposes, it has been generally necessary to cook the starch-and-water mixture (starch suspension) by boiling it for at least one-half hour, and in most cases from one to two hours. This is over and above the time required to heat the mixture to and through the swelling or jelling point (which varies from 140° F. to 185° F. depending upon the particular kind of starch used) and on up to the actual cooking or boiling temperature normally approximating 212° F. In order to obtain the desired degree of starch solubilization, cooking under pressure at still higher temperatures up to around 300° F. has frequently been resorted to in the processes heretofore employed. However, although prolonged heating of a starch at temperatures substantially above its swelling or jelling point, and especially at or above 212° F., promotes solubilization by increasing progressive swelling and rupturing of the starch granules, it promotes at the same time progressive degeneration of the starch into other products, principally sugars and dextrins, which are very undesirable as components of paper and textile sizes. Since it is difficult, when preparing sizes by such conventional cooking or thermal breakdown methods, to control at all closely the viscosity of the finished product, the viscosity of such product is not accurately predeterminable and may vary considerably in different batches cooked despite efforts to maintain uniformity. Nor is the viscosity of a boiled starch size stable; and in other respects also such size is apt to deteriorate very rapidly. Moreover, cooking methods are sometimes inadequate to provide starch solutions which are of sufficiently high concentration to meet the requirements for such purposes as sizes or fillers, but which are not at the same time so highly viscous as to be unmanageable or unsatisfactory at temperatures normally prevailing in the practical commercial applications involved. The range of viscosities obtainable for starchy solutions of given starch concentration, particularly those of relatively high concentration on the order of 10% or above, has heretofore been extremely limited.

The problem presented by the foregoing situation is of long standing in the art and various proposals have been advanced for solving it. None of these proposals has, however, provided a satisfactory substitute for the conventional cooking or boiling methods of preparing starch sizes and other starch dispersions.

The present invention makes it possible to overcome wholly, or in large part, the difficulties and objections inherent in the manufacture of aqueous starch dispersions as heretofore practiced, and at the same time to realize certain important practical advantages heretofore not attainable in this art. In the present novel process, cooking or boiling of the starch or starch-containing material may be, and most desirably is, completely eliminated. Instead, the mixture of raw starch or starch-containing material is heated only to or slightly above the swelling or jelling point of the starch. At the starch concentrations generally desired for textile and paper sizes, the mixture at this point will be a semi-solid viscous gel. In this condition and at substantially this temperature the gelatinized starch is then subjected to pressure homogenization as hereinabove defined. A single pressure homogenization of the gelatinized starch generally suffices for all practical purposes.

For carrying out this pressure homogenizing step of the new process, any apparatus operable to provide the above-stated essential conditions and characteristics of pressure homogenization may be employed. One particularly suitable type of apparatus is that disclosed in U. S. Letters Patent No. 1,550,832 to Colony, dated August 25, 1925, and use of this general type of apparatus in practicing the present process is recommended as likely to give the most satisfactory results. The impact effect produced upon the fluid by its striking the conduit wall as it leaves the homogenizing valve may be enhanced by locating an impact or breaker ring closely adjacent the edge of the homogenizing valve seat on the discharge side, as shown (e. g.) in U. S. Letters Patent No. 2,389,486 to Colony, so that the stream continuously discharging through the valve immediately impinges against said ring while traveling at very high velocity. Homogenizers of the general type shown in the aforesaid patents and including this impact ring are commercially available.

Assuming a homogenizer of this type to be employed in the present example illustrative of size manufacture in accordance with the novel process, the gelatinized but uncooked starch which, in this particular instance, is too viscous or stiff to be delivered by gravity flow through the intake conduit of the homogenizer and be drawn into the pump chamber thereof, is pumped under sufficient pressure to said intake conduit from the starch kettle in which the starch gel has been prepared. The starch gel enters the pump chamber of the homogenizer and is forced therefrom under the selected appropriate homogenizing pressure.

The homogenizing pressure advisable to employ in any given instance depends chiefly upon the kind of starch or starchy material that is to be processed, and the viscosity which it is desired the resultant starch dispersion shall have. Really effective modification of the starch or starch-containing material does not occur at operating pressures lower than about 250 p. s. i. For commercially acceptable results, the preferred range of pressures for size preparation lies between 400 and 5000 p. s. i. Practical considerations, notably costs for power and for apparatus investment and maintenance, which increase substantially especially when operating at pressures in excess of 5000 to 6000 p. s. i. indicate the inadvisability of using homogenizing pressures higher than 10,000 p. s. i. in the absence of exceptional circumstances. Indeed, there is ordinarily little to be gained by using pressures substantially above 6000 p. s. i.

The viscosity of the final starch dispersion produced may be regulated and controlled by proper control of the homogenization pressure. Increasing the pressure reduces the viscosity, and vice versa. By such pressure control, it is possible to prepare and maintain starch dispersions having a viscosity either higher or lower than those obtained by conventional cooking methods. There is a rapid drop in viscosity as the homogenizing pressure is increased from 250 to 500 p. s. i., the drop becoming more gradual from 500 to 1500 p. s. i., and still more gradual beyond that. In preparing textile sizes, the preferred range of pressures lies between 250 to 4000 p. s. i., with pressures of 400 to 1000 p. s. i. for potato starches being deemed most suitable in the light of present experience. Slightly higher pressures are found desirable where pearl corn starches are employed. For the preparation of sizes for use in paper manufacture, homogenizing pressures at the high end of the previously indicated range, that is, on the order of 5000 p. s. i. or perhaps higher, now appear to be optimum.

The conversion of the pre-gelatinized starch into size or other desired dispersion in accordance with the present invention without any cooking is accomplished, at whatever pressure within the range hereinabove indicated, in a period of time so brief (a very few seconds at the most) as to be virtually instantaneous or, in any event, negligible as compared to the prolonged converting period heretofore generally customary. In addition, the desired modification accomplished by the homogenizing treatment is substantially unaccompanied by the degradation of starch into dextrins and sugars usually inescapable in the prior practice.

Starch dispersions prepared by the new process are remarkably stable as regards viscosity and are characterized by good keeping qualities in general. For this reason they can be stored for relatively long periods with little or no deterioration, in contrast to the well-known tendency of boiled starch dispersions to separate and otherwise deteriorate rapidly upon standing for a comparatively short time. For example, textile starch sizes prepared by the present process show no change in viscosity in the size box of a slasher over a period of two hours or more, while starch sizes prepared by conventional methods show viscosity losses as high as 50% over the same period and under the same conditions. Because of the uniformity and smoothness of the sizes produced in accordance with the invention, the slashers may be run at much higher speed than is possible with the usual starch sizing. The slasher speed has in some instances been increased by as much as 30%, and the loom efficiency by as much as 7% in some cases. Increases of 1 or 2% in loom efficiency are considered very significant in practice. It also becomes possible to control with considerable accuracy the penetration of the size into the yarn, and to limit and render uniform the quantity of size remaining on the surface of the yarn. This results in a materially stronger yarn, with better elongation under stress. By obtaining controlled penetration and a uniform thickness of surface coating, which sizes prepared by the new process make possible, shedding both in the slasher and in the looms is largely eliminated. Furthermore, the uniformity and smooth creamy consistency of these sizes largely eliminates the occurrence of weak spots commonly produced in yarn due to uneven sizing, thus greatly lessening breakage of the yarn in the loom and the resultant stoppages, with consequent marked increase in the fabric yardage that can be woven per loom in a day.

In most cases, the quantity of starch called for by the previously customary formula for boiled starch can be reduced, while still obtaining a yarn breaking strength equal to or greater than that usually obtained with boiled size. Moreover, in the new process, the fats and waxes composing the customary softeners can, if desired, be added directly to the starch and water mixture before homogenization, thereby avoiding use of the more expensive ready-mixed commercial softeners, while at the same time ensuring much more complete and uniform distribution of the softening agents in the finished size than is possible in sizes produced by conventional methods. Coloring agents may also be conveniently incorporated in the starch and water mixture prior to homogenization in order to effect an exceptionally uniform coloring in the resultant size.

In order to enable a textile mill to produce size continuously by the new process, and at a rate sufficient to serve several slashers adequately with a single homogenizer, only two heating kettles need be used. While one batch of raw starch is being heated to the jelling temperature in one kettle, starch previously jelled in the other can be fed to the homogenizer. The sizing can be stored in a storage kettle and fed to the several slasher size boxes as needed. Moreover, the size boxes may be maintained at lower temperature than heretofore customary. It often becomes possible, furthermore, for a mill to operate a number of slashers at the same temperature for all size boxes and to use a single formula for the starch mix. Simply by changing the homogenizing pressure, and thus producing sizes of differing viscosities, a different desired amount of size can be applied to the yarn being handled through different slashers. Thus, if one slasher is operating on light yarn, a low viscosity sol may be fed to that machine from one storage kettle, while another operating on a heavier yarn could be supplied from another storage kettle with a higher viscosity sol; yet only one formula providing size of one given starch concentration, and the same operating temperature, may be used in both slashers.

Instead of preparing the uncooked, jelled starch mix in a heating kettle, this may of course be done by first mixing the raw starch (and, optionally, the softener) in a volume of cool water equal to $\frac{1}{5}$ to $\frac{1}{4}$ of the total volume of water ultimately required, and then adding the resultant starch milk to the remainder of the water which has been heated to boiling. As soon as the starch milk has been stirred into this boiling water, the starch jells and is ready for the homogenizing treatment.

Whichever method is used in preparing the gel, the temperature of the mixture of starch and water employed is on the order of and preferably slightly higher than, the jelling temperature of the particular type of starch being used. For the sake of greater operating efficiency, the higher temperatures are preferred so as to facilitate the feeding of the gel to the homogenizer. In any event, however, the maximum temperature is substantially below the boiling or cooking point of the gel, 200° F. being ordinarily a maximum. Since the gel is run through the homogenizer almost immediately upon reaching such higher temperature, there is little opportunity for degradation of the starch to occur.

In paper manufacture, a size of relatively low viscosity is required. Ordinary cooking methods of starch size preparation do not provide a size of sufficiently low viscosity at the required starch concentration and consequently it has been the practice to use "thin-boiling" starches which have previously been treated with a dilute acid, or an enzyme, or have been cooked under pressure for extended periods. The use of such starches adds to the expense of the sizing operations and the same problems of starch degeneration occur here as in the textile sizes. By homogenizing raw starch in water sufficiently hot to gelatinize it, while avoiding cooking, at the higher pressures mentioned herein, i. e. on the order of 5,000 p. s. i. or above, it is possible to obtain sizes which have far lower viscosities than those obtainable by straight cooking of raw starch. If still lower viscosities are desired, a dilute acid or enzyme may be added to the starch suspension just before homogenization. This method will permit the production of sizes of extremely low viscosity, on the order of as low as 40 seconds for a 7% starch solution at a test temperature of 100° F., in the standard Dudley pipette test. A viscosity of 45 seconds on the same scale is generally considered suitable for typical paper sizing operations.

Similar advantages may be obtained in the production of textile printing sizes, where viscosity control is more critical than in other cases of textile sizing and reproduction of previous results is highly important.

Further important applications of the present invention are to be found in processes involving starch mashes, such as those employed in beer, whiskey or alcohol manufacture. The mashing operations in all of these industries involve the modification of the starch contained in the grain whereby it is converted to the soluble form which can then be acted upon by the enzyme provided in the malt.

In the conventional mashing operations, raw ground grain is first cooked under pressure at temperatures of from 290° to 300° F. to gelatinize the starch. The mash thus produced must then be cooled down from these temperatures to a temperature on the order of from 145° to 155° F. before the addition of the malt, since the higher temperature would prevent the action of the enzyme in converting the starch to sugars. The cooling thus required is accordingly provided in practice by allowing the cooked mash to stand in large attemperators, these being in some cases provided with coils for circulating cold water therethrough; or the mash is passed over refrigerating coils to effect a continuous and more rapid cooling operation. In the first case, a large amount of space is taken up by the attemperators and there is the possibility of the mash becoming contaminated with undesired bacteria present in the air or remaining from previous mashes. The second method, while solving the problems just mentioned, is a highly expensive one. In either case, the malted grain is added to the cooled mash in what is known as the mashing tun in which the conversion of the starch to sugars is accomplished. After the mash has remained in the tun a sufficient length of time to ensure conversion of the starch to sugar, usually on the order of one and one half to two hours, the wort is drawn off from the bottom and fed to the wort copper for the addition of hops in making beer, or directly to the fermentation vessels in the manufacture of whiskey or alcohol, as the case may be.

By applying the process of the present invention to this procedure, substantial savings in material as well as time can be achieved. As illustrative of how this may be done, the procedure when modified in accordance with the invention comprises taking the raw ground grain and mixing it with water in the usual ratio of about 2 pounds of grain to one gallon of water and heating the suspension thus produced in a jacketed kettle, or by the direct injection of steam, to approximately 200° F. But as soon as this temperature has been reached, the suspension is homogenized at pressures between 250 and 5,000 p. s. i., preferably around 1000 to 1500 p. s. i., and the solution cooled to 150° F., for example, before the addition of malted grain. Furthermore, after the malt has been added, the mixture of converted grain and malt may optionally then be immediately pressure homogenized again. There is thus obtained, in any event, a very complete solubilization of the starch content of the grain at relatively low temperatures, in no case exceeding 200° F. and generally lower. Also, if the mixture is rehomogenized after addition of the malt, a very uniform mixture of the solubilized starch with the malt addition is brought about whereby accelerated and complete amylolysis is promoted. In either case, the resulting sweet wort is then further processed in the ordinary manner.

As a result of employing this process there is effected a very substantial saving in the amount of process steam needed since the long cooking period is eliminated. There is also a very substantial saving in the amount of refrigeration or other cooling needed between the steps of solubilizing the starch and adding the malt, since in prior processes the cooked grain emerges at temperatures on the order of 290° F. and has to be cooled down to 150° F. In the present process on the other hand, the temperature of the converted grain upon leaving the homogenizer is on the order of 190° F. and need only be cooled to 150°, or only 40° as against 140° under prior practice.

Although it has been emphasized hereinabove that the ability, through use of the new process, to eliminate entirely the heretofore customary cooking or boiling of starch is an outstandingly valuable feature of the present invention, it should be understood that accidentally heating the initial starch-water mix to the boiling point and keeping it there for a brief time insufficient to effect substantial cooking, prior to the homogenizing treatment, will ordinarily do no serious harm and does not take the procedure outside the invention.

For the sake of convenience in the foregoing discussion, the term "solution" as applied to starch is used to comprise both true solutions as well as fine colloidal dispersions which latter resemble true solutions in many respects.

Other specific examples of instances in which the teaching of the present invention may be applied, in addition to those disclosed hereinabove, will be apparent to those skilled in the art from the foregoing detailed description, and are to be understood as intended to be included within the scope of the appended claims.

This application is a continuation in part of abandoned application Ser. No. 91,010, filed May 2, 1949 and copending herewith.

What is claimed is:

1. The process of modifying the starch content of amylaceous material, which comprises subjecting an aqueous suspension of such material to heat at a temperature sufficiently high to gelatinize the starch content thereof, while avoiding prolonged cooking or boiling, and then subjecting the material thus prepared to pressure homogenization by forcing it, under pressure on the order of at least 250 pounds per square inch, to flow at high velocity through a positive displacement pressure homogenizer having a highly restricted discharge orifice and to impinge against a hard surface.

2. The process of modifying the starch content of amylaceous material, which comprises subjecting an aqueous suspension of such material to heat at a temperature sufficiently high to gelatinize the starch content thereof, while avoiding prolonged cooking or boiling, and then subjecting the material thus prepared to pressure homogenization by forcing it, under pressure within the range of from about 400 to 5000 pounds per square inch, to flow at high velocity through a positive displacement pressure homogenizer having a highly retricted discharge orifice and to impinge against a hard surface.

3. The process set forth in claim 1, wherein the jelled suspension, prior to being homogenized, is of relatively high concentration in respect of starch, and is of such thick consistency as to require pumping it under pressure to the intake of the homogenizer.

4. The process of modifying the starch content of amylaceous material as defined in claim 1, wherein the highest temperature to which the amylaceous material is subjected is within the approximate range of from 140° F. to 200° F.

5. The process of modifying the starch content of amylaceous material, which consists solely in subjecting an aqueous suspension of such material to heat at a temperature sufficiently high to gelatinize the starch content thereof, while avoiding prolonged cooking or boiling, and then subjecting the material thus prepared to pressure homogenization by forcing it, under pressure on the order of at least 250 pounds per square inch, to flow at high velocity through a positive displacement pressure homogenizer having a highly restricted discharge orifice and to impinge against a hard surface.

6. The process of producing a thin-boiling starch which comprises reacting starch and hot water with a dilute acid, and promptly subjecting the reaction mixture to pressure homogenization by forcing it, under pressure on the order of at least 250 pounds per square inch, to flow at high velocity through a positive displacement pressure homogenizer having a highly restricted discharge orifice and to impinge against a hard surface.

7. The process of modifying the starch content of amylaceous materials present in a brewer's or distiller's mash, which comprises mixing said materials with hot water to provide an aqueous suspension and promptly subjecting said suspension to pressure homogenization by forcing it, under pressure on the order of at least 250 pounds per square inch, to flow at high velocity through a positive displacement pressure homogenizer having a highly restricted discharge orifice and to impinge against a hard surface.

8. The process as defined in claim 7, in which the temperature of the suspension lies within about 5° to 25° F. above the jelling temperature of the highest jelling starch present at the time of homogenization.

9. The process of solubilizing the starch content of amylaceous materials present in brewer's or distiller's mashes, which comprises making up a suspension of said amylaceous materials in hot water and thereafter subjecting said suspension to pressure homogenization by forcing it, under pressure on the order of at least 250 pounds per square inch, to flow at high velocity through a positive displacement pressure homogenizer having a highly restricted discharge orifice and to impinge against a hard surface.

10. In a process of effecting amylolysis of a starch-containing mash, the steps which comprise adding an enzyme to said mash and subjecting it thereafter to pressure homogenization by forcing it, under pressure on the order of at least 250 pounds per square inch, to flow at high velocity through a positive displacement pressure homogenizer having a highly restricted discharge orifice and to impinge against a hard surface.

11. In a process of preparing brewer's or distiller's mash for fermentation, the steps which comprise solubilizing the starch content of said mash in hot aqueous solution and thereafter subjecting the mash to pressure homogenization to speed up the diastatic conversion of the starch to sugars and dextrins; such pressure homogenization being effected by forcing the fluid material, under pressure on the order of at least 250 pounds per square inch, to flow at high velocity through a positive displacement pressure homogenizer having a highly restricted discharge orifice and to impinge against a hard surface.

12. In a process of preparing starch mash for fermentation from malted and unmalted grain, the steps which comprise first solubilizing the starch content of the unmalted grain in hot aqueous solution at a temperature not substantially exceeding 200° F. by subjecting an aqueous suspension of said grain to pressure homogenization, cooling the resultant solution to a temperature not substantially exceeding 150° F., adding the malted grain and thereafter subjecting the mash to further pressure homogenization to accelerate amylolysis; each such pressure homogenization being effected by forcing the fluid material, under pressure on the order of at least 250 pounds per square inch, to flow at high velocity through a positive displacement pressure homogenizer having a highly restricted discharge orifice and to impinge against a hard surface.

13. The process of modifying the starch content of amylaceous material which comprises subjecting an aqueous suspension of such material to heat at a temperature sufficiently high to gelatinize the starch content thereof, while avoiding prolonged cooking or boiling, and then subjecting the material thus prepared to pressure homogenization by forcing it under pressure, on the order of at least 250 pounds per square inch, to flow at high velocity through a positive displacement pressure homogenizer having a discharge outlet formed by hard surfaces spaced apart a distance on the order of 0.001 to 0.005 inch and to impinge against a hard surface.

14. The process set forth in claim 13, wherein the pressure employed is from about 400 to 5,000 pounds per square inch.

15. The process set forth in claim 13, wherein the jelled suspension, prior to being homogenized, is of relatively high concentration in respect of starch, and is of such thick consistency as to require pumping it under pressure to the intake of the homogenizer.

16. The process of modifying the starch content of amylaceous material as defined in claim 13, wherein the highest temperature to which the amylaceous material is subjected is within the approximate range of from 140° F. to 200° F.

17. The process of producing a thin-boiling starch which comprises reacting starch and hot water with a dilute acid, and promptly subjecting the reaction mixture to pressure homogenization by forcing it under pressure on the order of at least 250 pounds per square inch to flow at high velocity through a positive displacement pressure homogenizer having a discharge outlet formed by hard surfaces spaced apart a distance on the order of 0.001 to 0.005 inch and to impinge against a hard surface.

18. The process of modifying the starch content of amylaceous materials present in a brewer's or distiller's mash, which comprises mixing said materials with hot water to provide an aqueous suspension and promptly subjecting said suspension to pressure homogenization by forcing it under pressure on the order of at least 250 pounds per square inch to flow at high velocity through a positive displacement pressure homogenizer having a discharge outlet formed by hard surfaces spaced apart a distance on the order of 0.001 to 0.005 inch and to impinge against a hard surface.

19. The process as defined in claim 18, in which the temperature of the suspension lies within about 5° to 25° F. above the jelling temperature of the highest jelling starch present at the time of homogenization.

20. In a process of effecting amylolysis of a starch-containing mash, the steps which comprise adding an enzyme to said mash and subjecting it thereafter to pressure homogenization by forcing it under pressure on the order of at least 250 pounds per square inch to flow at high velocity through a positive displacement pressure homogenizer having a discharge outlet formed by hard surfaces spaced apart a distance on the order of 0.001 to 0.005 inch and to impinge against a hard surface.

21. In a process of preparing brewer's or distiller's mash for fermentation, the steps which comprise solubilizing the starch content of said mash in hot aqueous solution and thereafter subjecting the mash to pressure homogenization to speed up the diastatic conversion of the starch to sugars and dextrins; such pressure homogenization being effected by forcing the fluid material under pressure on the order of at least 250 pounds per square inch to flow at high velocity through a positive displacement pressure homogenizer having a discharge outlet formed by hard surfaces spaced apart a distance on the order of 0.001 to 0.005 inch and to impinge against a hard surface.

22. In a process of preparing starch mash for fermentation from malted and unmalted grain, the steps which comprise first solubilizing the starch content of the unmalted grain in hot aqueous solution at a temperature not substantially exceeding 200° F. by subjecting an aqueous suspension of said grain to pressure homogenization, cooling the resultant solution to a temperature not substantially exceeding 150° F., adding the malted grain and thereafter subjecting the mash to further pressure homogenization to accelerate amylolysis; each such pressure homogenization being effected by forcing the fluid material under pressure on the order of at least 250 pounds per square inch to flow at high velocity through a positive displacement pressure homogenizer having a discharge outlet formed by hard surfaces spaced apart a distance on the order of 0.001 to 0.005 inch and to impinge against a hard surface.

LANCELOT H. REES.

References Cited in the file of this patent

UNITED STATES PATENTS

| Number | Name | Date |
| --- | --- | --- |
| 1,548,721 | Ling | Aug. 4, 1925 |
| 1,947,295 | Jozsa | Feb. 13, 1934 |
| 2,105,052 | Oltmans | Jan. 11, 1938 |
| 2,417,969 | Caesar et al. | Mar. 25, 1947 |
| 2,481,436 | Miller | Sept. 6, 1949 |